United States Patent
Ohm et al.

(10) Patent No.: US 10,941,764 B2
(45) Date of Patent: Mar. 9, 2021

(54) PISTON PUMP ASSEMBLY FOR A HYDRAULIC POWER VEHICLE BRAKING SYSTEM

(71) Applicant: Robert Bosch GmbH, Stuttgart (DE)

(72) Inventors: Andreas Ohm, Kupferzell (DE); Claus Oehler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/030,942

(22) Filed: Jul. 10, 2018

(65) Prior Publication Data

US 2019/0017502 A1  Jan. 17, 2019

(30) Foreign Application Priority Data

Jul. 12, 2017 (DE) .................... 10 2017 211 873

(51) Int. Cl.
| | |
|---|---|
| *F04B 53/14* | (2006.01) |
| *B60T 13/16* | (2006.01) |
| *F04B 19/22* | (2006.01) |
| *F04B 17/03* | (2006.01) |
| *F04B 53/16* | (2006.01) |
| *B60T 13/74* | (2006.01) |
| *F16H 25/20* | (2006.01) |
| *F16H 25/22* | (2006.01) |

(52) U.S. Cl.
CPC .............. *F04B 53/14* (2013.01); *B60T 13/16* (2013.01); *B60T 13/162* (2013.01); *B60T 13/745* (2013.01); *F04B 17/03* (2013.01); *F04B 19/22* (2013.01); *F04B 53/162* (2013.01); *F16H 25/20* (2013.01); *B60T 2270/10* (2013.01); *F16H 25/2204* (2013.01); *F16H 2025/2078* (2013.01); *F16H 2025/2087* (2013.01)

(58) Field of Classification Search
CPC .. B60T 13/162; B60T 13/745; F15B 15/1414; F16H 25/2204; F16H 25/2454
See application file for complete search history.

(56) References Cited

U.S. PATENT DOCUMENTS

| | | | | |
|---|---|---|---|---|
| 3,466,945 A | * | 9/1969 | McNeal, Jr. | ........ F16H 25/2204 74/625 |
| 3,693,759 A | * | 9/1972 | Schindel | .................. F03G 1/00 185/40 R |
| 3,827,821 A | * | 8/1974 | Swenson | ............... B23B 51/102 408/59 |
| 4,075,923 A | * | 2/1978 | Latham | ................. F16B 31/043 29/446 |

(Continued)

FOREIGN PATENT DOCUMENTS

| | | | | |
|---|---|---|---|---|
| DE | 3718308 A1 | * | 1/1989 | .......... F15B 15/1414 |
| FR | 925445 A | * | 9/1947 | .......... F15B 15/1414 |

*Primary Examiner* — Abiy Teka
*Assistant Examiner* — Matthew Wiblin
(74) *Attorney, Agent, or Firm* — Norton Rose Fulbright US LLP; Gerard Messina

(57) ABSTRACT

A piston pump assembly for a hydraulic power vehicle braking system including an electric motor, a planetary gear set, a helical gear, and a piston which is displaceable in a cylinder. To prevent the piston from rotating in the cylinder, cylinder pins are situated in grooves at an inner side of the cylinder and engage with the recesses in a flange of the piston. Due to reshaping, the grooves are closed at one end, so that the cylinder pins are axially secured.

5 Claims, 2 Drawing Sheets

(56) References Cited

U.S. PATENT DOCUMENTS

| | | | | |
|---|---|---|---|---|
| 8,118,571 B2 * | 2/2012 | Krisher | ............... | F16D 29/005 |
| | | | | 417/415 |
| 2003/0079913 A1 * | 5/2003 | Eppink | ............... | E21B 10/325 |
| | | | | 175/61 |
| 2015/0308549 A1 * | 10/2015 | Hirai | ................. | F16H 25/205 |
| | | | | 74/89.29 |
| 2015/0377261 A1 * | 12/2015 | Weh | ..................... | F04B 9/02 |
| | | | | 92/33 |
| 2016/0033019 A1 * | 2/2016 | Aramoto | ............... | F16H 25/24 |
| | | | | 74/424.81 |
| 2017/0088251 A1 * | 3/2017 | Nfonguem | .............. | F16H 25/20 |
| 2018/0283511 A1 * | 10/2018 | Tashiro | ............... | B60T 13/741 |

* cited by examiner

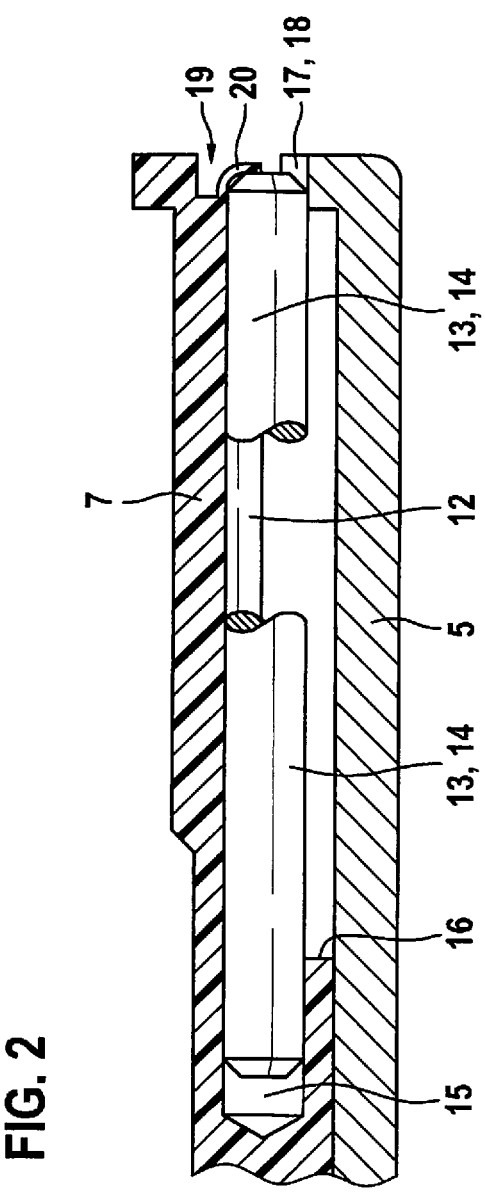

PISTON PUMP ASSEMBLY FOR A HYDRAULIC POWER VEHICLE BRAKING SYSTEM

CROSS REFERENCE

The present application claims the benefit under 35 U.S.C. § 119 of German Patent Application No. DE 102017211873.3 filed on Jul. 12, 2017, which is expressly incorporated herein by reference in its entirety.

BACKGROUND INFORMATION

The present invention relates to a piston pump assembly for a hydraulic power vehicle braking system.

In hydraulic power vehicle braking systems, piston pumps are used to generate a hydraulic brake pressure for a service braking through external power and/or in slip-controlled vehicle braking systems, they are also used to generate a brake pressure and to convey brake fluid from wheel brakes back to the wheel brakes following a pressure drop, for the purpose of again increasing the wheel brake pressures, or back in the direction of a main brake cylinder during a slip regulation.

SUMMARY

The piston pump assembly according to the present invention is provided to generate a brake pressure and/or to convey brake fluid in a hydraulic power and/or slip-controlled vehicle braking system. It includes an electric motor as the drive, a helical gear, for example a spindle drive, which converts a rotary driving motion of the electric motor into a translatory motion, and a piston/cylinder unit whose piston is displaceable in the cylinder with the aid of the helical gear. In this case, a relative movement between piston and cylinder is involved; the cylinder may also be displaced on the piston. A reduction gear unit, for example a planetary gear set, may be interconnected between the electric motor and the helical gear.

To prevent the piston from rotating in the cylinder, the cylinder includes on the inside and/or the piston includes on the outside a groove which runs in a displacement direction of the piston in the cylinder and with which a torque support element engages which is established at the piston and/or in the cylinder in the circumferential direction. At one end, the groove has a constriction, so that the torque support element is not able to axially exit. For example, the groove is closed by a reshaping of the material surrounding that end. If the groove is located inside the cylinder, the torque support element is established at the piston in the circumferential direction and vice versa. In the circumferential direction, the torque support element may also be established displaceably in the displacement direction of the piston in the cylinder and include a groove, for example, with which the torque support element also engages, i.e., include two opposite grooves, one inside the cylinder and one at the outside of the piston.

The present invention prevents the torque support element from exiting the groove and, for example, from entering an adjoining reduction gear unit or the helical gear.

The groove may run in the displacement direction or at an angle to the displacement direction of the piston in the cylinder. Its profile includes a component in the displacement direction and potentially an additional component in a circumferential direction, for example. For example, the groove runs in a straight line and axially parallel or in a helical manner.

To be able to insert the torque support element into the groove in the displacement direction of the piston in the cylinder, the constriction may be applied subsequently, for example by reshaping the material. In this embodiment of the present invention, the torque support element may be inserted into the groove in the displacement direction of the piston in the cylinder without the constriction or prior to forming the constriction. This simplifies or facilitates an assembly of the piston and the cylinder.

Advantageous embodiments and refinements of the present invention are described herein.

BRIEF DESCRIPTION OF THE DRAWINGS

The present invention is explained in greater detail below on the basis of one specific example embodiment.

FIG. 2 shows an enlarged illustration of a detail according to arrow II in FIG. 1.

DETAILED DESCRIPTION OF EXAMPLE EMBODIMENTS

Figure 1:
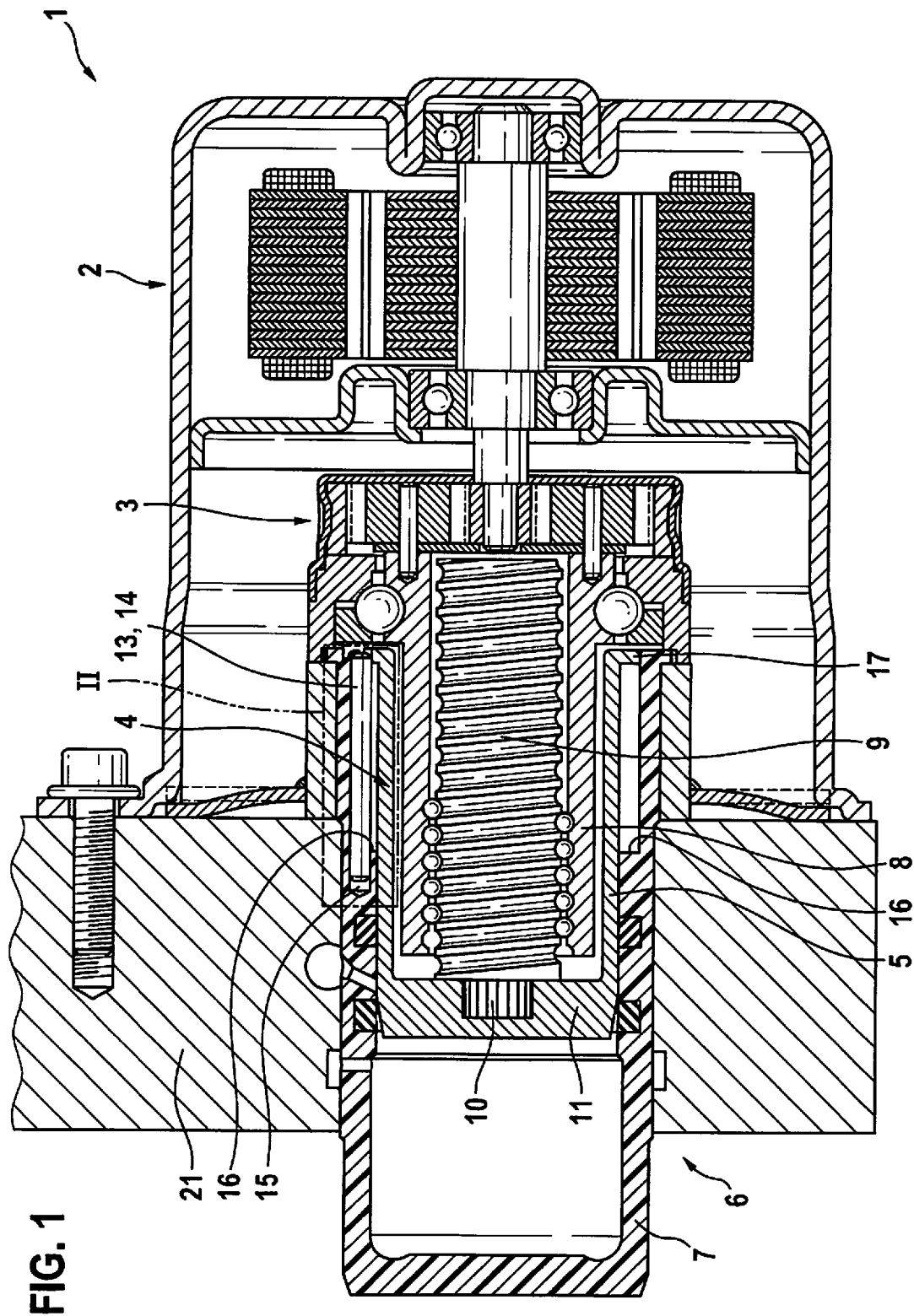
FIG. 1 shows an axial section of a piston pump assembly according to the present invention.

Piston pump assembly 1 according to the present invention and illustrated in the figures is provided to generate pressure in a hydraulic power vehicle braking system and/or to generate pressure and to convey brake fluid in a slip-controlled hydraulic vehicle braking system during a slip regulation. Such slip regulations are, for example, anti-lock braking systems, traction control systems, electronic stability control systems and electronic stability programs, for which the abbreviations ABS, TCS, ESC and ESP are commonly used.

For driving, piston pump assembly 1 according to the present invention includes an electric motor 2 with the aid of which a planetary gear set 3 is drivable. Planetary gear set 3 rotatably drives a helical gear 4 which converts the rotary motion into a displacement for the purpose of displacing a piston 5 of a piston/cylinder unit 6 in a cylinder 7. Piston 5 is axially displaceable in cylinder 7, i.e., a displacement direction of piston 5 in cylinder 7 is axial or axially parallel. In the described and elucidated specific embodiment of the present invention, helical gear 4 is a ball screw gear. Planetary gear set 3 rotatably drives a nut 8 of helical gear 4 and nut 8 displaces a spindle 9 of helical gear 4. Deviating therefrom, it is also possible that spindle 9 is rotatably driven and nut 8 is displaced together with piston 5. An end of spindle 9, which is distant from planetary gear set 3 and electric motor 2, is connected through a journal 10, which is designed in one piece with spindle 9 and is pressed into a blind hole in a piston base 11 of piston 5, to piston 5 so that piston 5 is displaced together with spindle 9. Piston 5 is designed as a hollow piston which is closed in one piece by its piston base 11 at the end distant from planetary gear set 3 and electric motor 2 and which encloses nut 8 of helical gear 4 in cylinder 7 of piston/cylinder unit 6. The above-described components of piston pump assembly 1, i.e., electric motor 2, planetary gear set 3 which is situated between electric motor 2 and helical gear 4, helical gear 4, piston 5, and cylinder 7 are coaxial.

To prevent piston 5 from rotating in cylinder 7, cylinder 7 includes on its inside three axially parallel grooves 12 which are distributed across a circumference, have semicircular cross sections and in which cylinder pins 13 are inserted which may in general also be understood as torque support elements 14. The rotation prevention device of piston 5 in cylinder 7 is illustrated in FIG. 2 in an enlarged manner, where only one of cylinder pins 13, a fragment of piston 5, and a fragment of cylinder 7 are drawn in the area of one of grooves 12. At an end distant from planetary gear set 3, grooves 12 transition at a ring stage 16 inside cylinder 7 into blind holes 15 in which the ends of cylinder pins 13 are accommodated. At its end close to planetary gear set 3, piston 5 includes a radially outward-positioned flange 17 having three semicircular recesses which form receptacles 18 for cylinder pins 13. Cylinder pins 13 are established at piston 5 in receptacles 18 in a circumferential direction. Receptacles 18 guide piston 5 axially displaceably and rotatably fixedly along cylinder pins 13 and in cylinder 7. In the exemplary embodiment, grooves 12 are evenly distributed across the circumference. An uneven distribution and/or a number of grooves 12 other than three and three cylinder pins 13 as torque support elements 14 are also possible. In principle, one groove 12 and one cylinder pin 13 are sufficient, but it is also possible to have two, three or more grooves 12 and cylinder pins 13. Other torque support elements 14 are also possible instead of cylinder pins 13. In particular, torque support elements 14 are straight profile elements having a constant cross section across their lengths. For example, the torque support elements may have a rectangular cross section (not illustrated).

To prevent cylinder pins 13 which form torque support elements 14 from exiting grooves 12 in the direction of planetary gear set 3 during the up and down movement of piston 5 in cylinder 7, the ends of grooves 12 facing planetary gear set 3 are closed.

To close grooves 12, cylinder 7 has at a front end facing planetary gear set 3 a circumferential groove 19 whose inner groove flank is reshaped towards the inside at least in the area of axially parallel grooves 12, so that the ends of grooves 12 facing planetary gear set 3 are closed. The reshaping of grooves 12 towards the inside may be in general also understood as a constriction 20 of grooves 12 which prevents cylinder pins 13 from exiting axially from grooves 12. The inner groove flank of circumferential groove 19 at the front end of cylinder 7 is not reshaped towards the inside to form constriction 20 until piston 5 is inserted into cylinder 7 and cylinder pins 13 are inserted into grooves 12, blind holes 15, and receptacles 18.

Piston pump assembly 1 according to the present invention is situated at a hydraulic block 21 of a slip regulation of a hydraulic power vehicle braking system, which is not illustrated, piston pump assembly 1 being part of the slip regulation. Such slip regulations and hydraulic blocks 21 are conventional to those skilled in the art and are not explained here in greater detail. Hydraulic block 21 is used to mechanically fasten and hydraulically interconnect hydraulic, electrohydraulic, and electronic components of the slip regulation which include, in addition to piston pump assembly 1, solenoid valves, check valves, hydraulic accumulators, and damping chambers which are situated in and at hydraulic block 21 and which are hydraulically interconnected with one another through a bore of hydraulic block 21. Hydraulic block 21 which is equipped with piston pump assembly 1 and the other components of the slip regulation forms a hydraulic assembly which is an integral part or a main item of the slip regulation. During a service braking, a brake pressure of the vehicle braking system is generated through external power using piston pump assembly 1 according to the present invention.

What is claimed is:

1. A piston pump assembly for a hydraulic power vehicle braking system, comprising:
    an electric motor;
    a helical gear which is rotatably drivable with the aid of the electric motor and converts a rotary motion of the electric motor into a displacement; and
    a piston/cylinder unit including a piston which is displaceable in a cylinder with the aid of the helical gear;
        wherein: (i) the cylinder includes at an inside, or (ii) the piston includes at an outside, a groove which runs in a displacement direction of the piston in the cylinder and with which a torque support element engages which is established at at least one of the piston and in the cylinder in the circumferential direction, to prevent the piston from rotating in the cylinder, and the groove has a constriction at one end, so that the torque support element is not able to axially exit, wherein the constriction of the groove is produced by reshaping at least one of the cylinder and the piston.

2. The piston pump assembly as recited in claim 1, wherein one of the piston or the cylinder, includes a receptacle, which is situated opposite the groove, in which the torque support element is situated and which is open at the one end at which the groove has the constriction.

3. The piston pump assembly as recited in claim 1, wherein the torque support element is inserted in the displacement direction into the groove without the constriction.

4. The piston pump assembly as recited in claim 1, wherein the torque support element is a cylinder pin.

5. A piston pump assembly for a hydraulic power vehicle braking system, comprising:
    an electric motor;
    a helical gear which is rotatably drivable with the aid of the electric motor and converts a rotary motion of the electric motor into a displacement and
    a piston/cylinder unit including a piston which is displaceable in a cylinder with the aid of the helical gear;
        wherein: (i) the cylinder includes at an inside, or (ii) the piston includes at an outside, a groove which runs in a displacement direction of the piston in the cylinder and with which a torque support element engages which is established at at least one of the piston and in the cylinder in the circumferential direction, to prevent the piston from rotating in the cylinder, and the groove has a constriction at one end, so that the torque support element is not able to axially exit, wherein at least one of the cylinder and the piston includes a circumferential groove at a front end and the constriction is produced by bending a groove flank of the groove.

\* \* \* \* \*